COMPRESSION-EXPANSION INFORMATION TRANSMISSION SYSTEM USING AN FM COMPRESSION PILOT SIGNAL

Filed Sept. 5, 1967 2 Sheets-Sheet 1

INVENTORS
PETRUS C.M. ALMERING
HENRI J. VELO
JOHANNES A. GREEFKES
BY
Frank R. Trifari
AGENT INVENTORS
PETRUS C.M. ALMERING
HENRI J. VELO
JOHANNES A. GREEFKES
BY
Frank R. Trifari
AGENT United States Patent Office 3,559,068
Patented Jan. 26, 1971

3,559,068
COMPRESSION-EXPANSION INFORMATION TRANSMISSION SYSTEM USING AN FM COMPRESSION PILOT SIGNAL

Petrus Cornelis Maria Almering and Henri Jan Velo, Hilversum, and Johannes Anton Greefkes, Emmasingel, Eindhoven, Netherlands, assignors, by mesne assignments, to U.S. Philips Corporation, New York, N.Y., a corporation of Delaware Filed Sept. 5, 1967, Ser. No. 665,473
Claims priority, application Netherlands, Sept. 2, 1966, 6612386
Int. Cl. H04b *1/68*
U.S. Cl. 325—50 14 Claims

ABSTRACT OF THE DISCLOSURE

A communication system in which the transmitter is provided with a dynamic compressor, and the receiver is provided with a dynamic expander. The transmitter also transmits a control signal that is time modulated (e.g. frequency or phase) in accordance with the compression. The receiver includes means responsive to the control signal for controlling the expander.

This invention relates to a system for the transmission of signals comprising a transmitter including a dynamic compressor and a receiver having a dynamic expander, the dynamic compressor being provided with a compander, a compression rectifier fed by the signals to be transmitted and a control signal source which supplies a control signal situated outside the signal band, the signals to be transmitted and the control signal being supplied to the compander and the expander being provided with a compander and a control signal filter for the selection of the co-transmitted control signal, and transmitters and receivers for use in said system. Such compressors and expanders are used in practice with advantage for the reduction of the noise introduced in the transmission path.

In an advantageous transmission system of the said type, the transmitter of which is described in Ensink et al., U.S. Pat. No. 3,024,313 and the receiver in Belgian patent specification No. 543,256, the co-transmitted control signal, which varies at the transmitter end with the attenuation of the compander, is utilized at the receiver end to regain the original dynamic range by selecting the control signal at the output of the compander with the aid of the control signal filter and by applying such a feedback that the control signal is restored again to a constant value. Apart from the fact that in the said system special attention must be paid to the design of the expander, especially in connection with its stability since the selective control signal filter is incorporated in a feedback control system, the said transmission system affords the advantage that the dynamic range of the original signals is regained accurately, independent of attenuation variations in the transmission path and of the control characteristics of the companders serving for dynamic compression and expansion.

When applying the said transmission system for music transmission over carrier communications of great lengths, for example, 2500 km. and more, the quality of the music reproduction is, however, not found to be satisfying the required expectations and, as was found by the applicant, this decrease of the reproduction quality is mainly to be ascribed to the fact that the noise occurring in the long carrier communication has a disturbing influence on the control signal serving for regaining the signal dynamic range, which control signal varies in level, for example, over a range of 30 db, as a result of the compression. An increase in the level of the control signal for reduction of the noise influence is not permissible in such a carrier communication, since a result of this an overdrive of the amplifier stations would occur in the transmission path which would result in unwanted intermodulation and cross-talk phenomena.

An object of the invention is to provide another conception of a system of the type described in the preamble in which together with a compansion independent of the control characteristics of the companders at the transmitter and receiver ends, and of the attenuation variations in the transmission path, the stability difficulties are obviated on the one hand and the noise interference is reduced to a considerable extent on the other hand so that a music transmission of excellent reproduction quality is realized over long carrier communications.

The transmission system according to the invention is characterized in that the control signal source of the dynamic compressor is provided with a time modulator which is controlled by the output signal of a difference producer to the input terminals of which are applied the output signal of the compression rectifier on the one hand and the output signal of a time demodulator connected to the output circuit of the time modulator on the other hand, while the expander includes a difference producer, the output signal of which controls the compander and to the input terminals of which are applied on the one hand the output signal of a time demodulator, which is fed by the receiver control signal selected in the control signal filter and limited in an amplitude limiter, and, on the other hand the output signal of a rectifier to which the output signal of the compander is supplied.

Time modulation is to be understood to mean a method of modulation in which an output oscillation of constant output amplitude is modulated in its time character by the signals to be transmitted, for example, frequency modulation, delta modulation, pulse duration modulation, etc. Of all these methods of modulation, frequency modulation is applied with advantage in the system according to the invention.

In order that the invention may be readily carried into effect, it will now be described in detail, by way of example, with reference to the accompany diagrammatic drawings, in which:

FIG. 2 shows a receiver according to the invention, while

Figure 1:
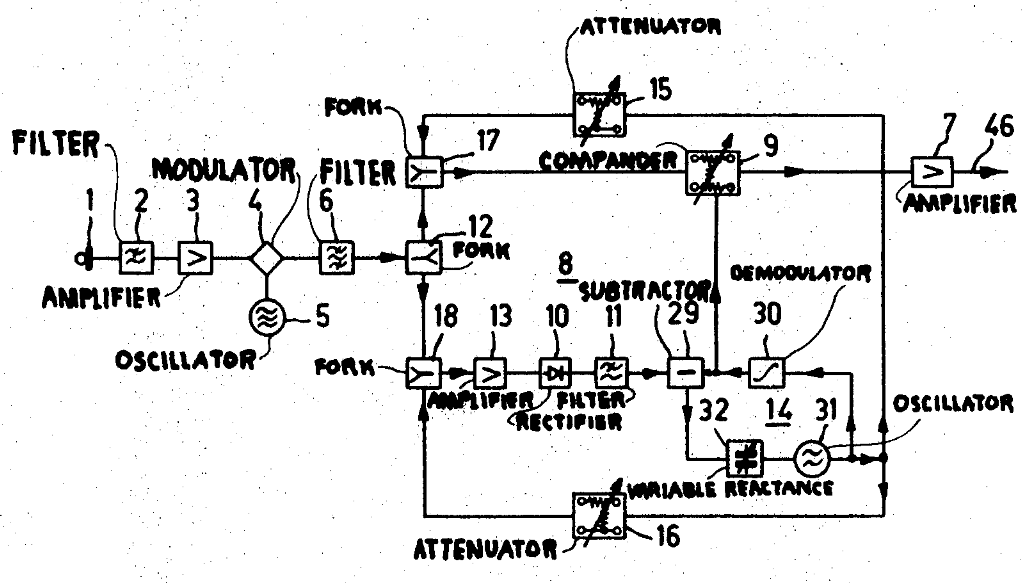
FIG. 1 shows a transmitter according to the invention.

The transmitter according to the invention shown in FIG. 1 forms part of a carrier telephony system for the transmission of signal over a distance of, for example, 2500 km., and is intended for the transmission of music signals situated, for example, in the band of 0.03–15 kc./s. In this band, a bandwidth of approximately 20 kc./s. is reserved per music channel.

In said system the music signals originating from a microphone 1 are supplied through a filter 2 passing the music signals at a passband of 0.03–15 kc./s. and a low-frequency amplifier 3 to a single sideband modulator 4 with a local oscillator 5 connected thereto and to a single sideband filter 6, the single sideband modulator 4 transposing the music signals to the band of 88.03–103 kc./s. with the possible interposition of a transposition stage. This single sideband signal is supplied for further transmission to an output line 46 after amplification in an amplifier 7.

A compressor 8 is provided for compression between the single sideband filter 6 and the amplifier 7 which compressor includes a compander 9 and a compression rectifier 10 having an associated low pass filter 11 at, for example, a limit frequency of 200 c./s. at which the single sideband signals to be transmitted are supplied by means of a fork 12 to the compander 9 and through an amplifier 13 to the compression rectifier 10. By "fork" is meant any circuit which divides an input signal into two output signals. Such circuits are well known in the telephone art. The compression rectifier 10 is formed by a mean-value rectifier such as a diode 45 of FIG. 3 of said U.S. patent while the compander 9 consists of an adjustable attenuation network controlled by a control voltage in which network rectifier cells are used as variable resistors. A compander is shown by components 34 to 41 of FIG. 3 of said U.S. patent.

The compressor 8 also includes a control signal source 14 for the generation of a control signal situated outside the signal band which together with the single sideband signals is supplied to both the compander 9 and the compression rectifier 10 through adjustable attenuation networks 15, 16 and forks 17, 18. The level of the control signal is adjusted by means of the adjustable attenuators 15, 16, to a considerably lower value than the maximum level of the signal sideband signals at the inputs of the compander 9 and the compression rectifier 10.

In the system described thus far, a voltage varying with the dynamic range of the single sideband signals appears at the output circuit of the compression rectifier 10 by rectification of the single sideband signals, which voltage follows the dynamic range of the music signals more accurately than that which would have been obtained by direct rectification of the low-frequency music signals. If the voltage of the music signals increases at the compression rectifier 10 at a level of the music signals above that of the control signal this increase causes a corresponding increase of the compression voltage so that the attenuation of the compander 9 is increased resulting in an increase of attenuation counteracting the said voltage increase of the music signals, while conversely a voltage decrease of the music signals causes an attenuation decrease of the compander 9. The control signal experiences a corresponding variation of the attenuation of the compander 9 and thus characterizes by its amplitude the compression of the single sideband signals supplied to the compander 9.

However, with a decrease of the music level to below the level of the control signal or in the absence of music signals the compression voltage at the output of the compression rectifier 10 will mainly be supplied by the constant control signal which determine the minimum attenuation of the compander 9. With the aid of the adjustable attenuation network 16, the level of the control signal and thus the lower limit of the compression control range is adjusted as desired.

Figure 2:
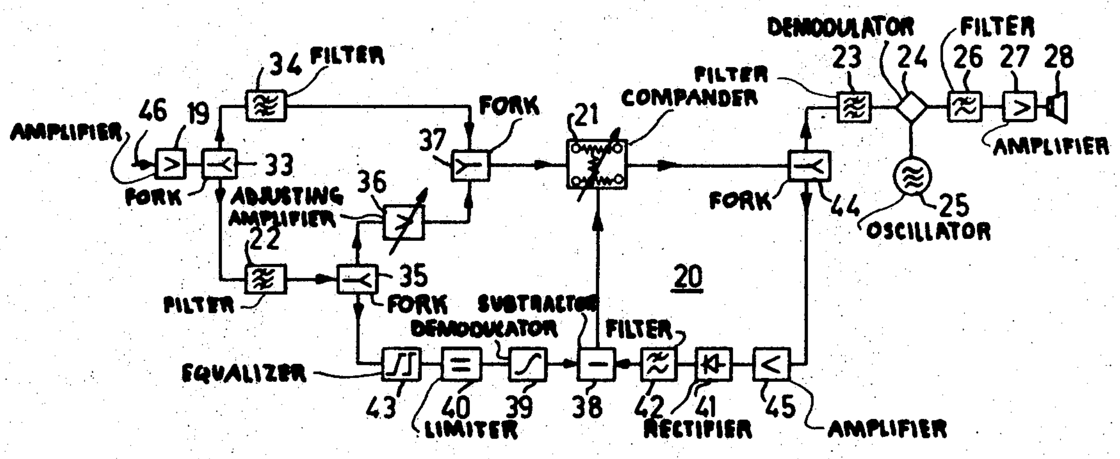

FIG. 2 shows the receiver cooperating with the transmitter of FIG. 1, in which the single sideband music signals received through line 46 and the co-transmitted control signal are supplied to an expander 20 through an amplifier 19, the expander being provided with a compander 21.

For the expansion control to be described hereinafter, the expander 20 is provided with a control signal filter 22 for the selection of the transmitted control signal, the expanded music signal derived from the output of the compander 21 being supplied through a filter 23 exclusively passing the single sideband music signal to a single sideband demodulator 24 having a local carrier oscillator 25 connected thereto and an associated low pass filter 26. The low-frequency music signal in the band of 0.03–15 kc./s. appears at the output of the low pass filter 26, which music signal is supplied to reproduction device 28 through a low-frequency amplifier 27.

Figure 3:
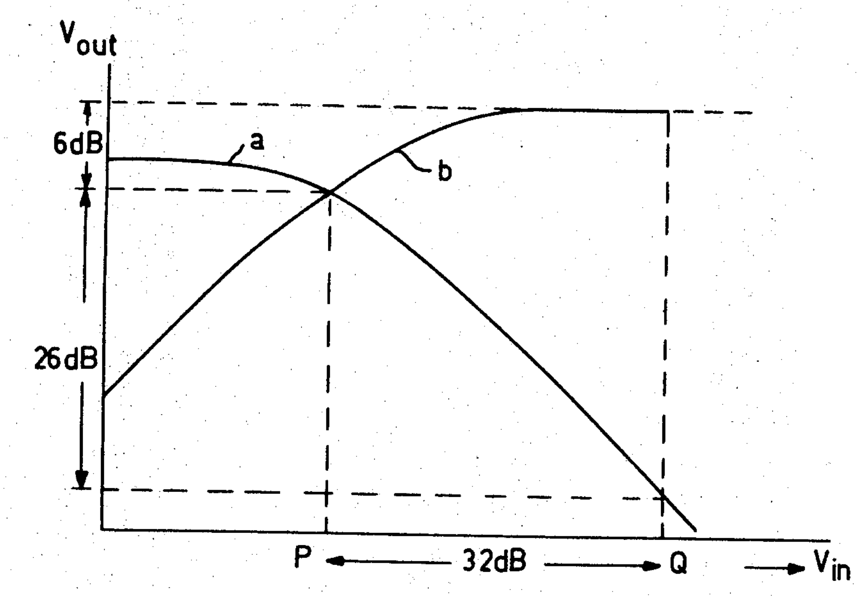
FIG. 3 shows some control characteristics.

For explanation of the transmission system described, the control characteristic of the compression system shown in FIG. 1 is illustrated by FIG. 3, in which the level of the control signal appearing at the output of the compander, and the level of the single sideband music signal, are plotted in db as a function of the level of the single sideband music signal $V_{in}$ supplied to the input of the compander. To realize optimum conditions in this system the level of the control signal at the input of the compander 9 and of the amplifier 13 respectively is adjusted at a suitable value with the aid of the adjustable attenuators 15, 16; for example, the intensity ratios of the control signal and the single sideband music signal are 31 db and 26 db respectively at maximum music level so that these intensity ratios mutually differ by a factor 1.78.

In conformity with the preceding explanation, the compander has a substantially constant attenuation at an input level of the single sideband music signal appearing at the compression rectifier 10, which level is smaller than the input level of the control signal, while above said level the attenuation of the compander 9 increases with the level of the said single sideband music signal. In this control characteristic the variation of the level of the control signal is represented by the curve *a*, while the curve *b* shows the variation of the level of the single sideband music signal.

The compression control range of the shown transmission system for music transmission over a distance of 2500 km. is indicated in the figure by PQ and in approximately 32 db. As is shown by this figure, the level *b* of the single sideband music signal in the compression control range PQ of approximately 32 db increases only by 6 db and the level *a* of the control signal decreases by 26 db, the level of the control signal in case of a music signal of maximum intensity being approximately 32 db weaker than that of the single sideband music signal.

The application of the co-transmitted control signal affords the important advantage that the dynamic range variations at the receiver end can accurately be regained independent of the control characteristics of the applied compander 9, 21 and of variations of attenuation in the transmission path 46, the control signal characterizing by its level the variations of attenuation which are experienced by the single sideband music signal in the transmission path. It is, however, found that a decrease of the reproduction quality occurs in the described system for music transmission over the 2500 km. long carrier communication, which decrease as was found by the applicant, is to be ascribed to the fact that more particularly during the strong music passages the then low level of the control signal (compare FIG. 3) is influenced in a disturbing manner by the noise in the said transmission path which may be approximately 4300 p.W. per kc./s. of bandwidth at a 2500 km. long carrier communication.

Together with an extreme independency of the control characteristics of the companders 9, 21 applied to the transmitter and receiver ends and the variations of attenuation in the transmission path 46 an extreme reduction of this noise interference is realized according to the invention in that the control signal source 14 of the compressor 8 is provided with a time modulator in the form of a frequency modulator which is controlled by the output signal of a difference producer 29, for example, consisting of a difference amplifier, to the input terminals of which are applied the output signal of the compression rectifier 10 and the output signal of a frequency demodulator 30 connected to the output circuit of the frequency modulator. The difference amplifier produces an output signal which is the difference of the amplitudes of the two input signals. In this case the frequency modulator is formed by a variable reactance 32 connected to a local oscillator 31 having a frequency of 86.6 kc./s. which reactance causes a maximum frequency shift of the oscillator frequency of for example 1.5 kc./s.

In the system shown, the circuit is formed by: output difference producer 29, variable reactance 32, oscillator 31, frequency demodulator 30, input difference producer 29, a feedback control system in which the output signal of the freqeuncy demodulator 30 is forced to follow exactly the output signal of the compression rectifier 10, If, for example, the output signal of the compression rectifier 10 increases, then the output signal of the difference producer 29 will also start to increase and cause an increase of its frequency deviation relative to the normal oscillator frequency of 86.6 kc./s., through the variable reactance 32 in the oscillator 31, which results in an increase of the output signal of the frequency demodulator 30 which counteracts the increase of the output signal of the difference producer 29. Conversely, with a decrease of the output signal of the compression rectifier 10, the frequency deviation of the oscillator 31 will decrease and a corresponding decrease of the output signal of the frequency demodulator 30 will occur which will counteract the decrease of the output signal of the difference producer 29 caused by the decrease of the output signal of the compression rectifier 10. Thus a level variation of the compression rectifier 10 will exactly be followed by a frequency variation of the oscillator frequency and a corresponding variation of the output signal of the frequency demodulator 30. In the embodiment shown, the output signal of the frequency demodulator 30 is supplied as a control signal to the compander 9.

Characteristic of the system according to the invention is that in the level variation of the music signals the control signal co-transmitted through line 46 simultaneously experiences a variation both in its level and in its frequency, which variations are mutually opposed. More particularly with a strong music level, the control signal will have a low level (see FIG. 3) and a high frequency deviation while with a weak music level the control signal will have a high level and a low frequency deviation so that the disturbing noise interference is reduced to a far extent at the receiver end in regaining the dynamic range of the music signals as a function of the control signal.

Figure 4:
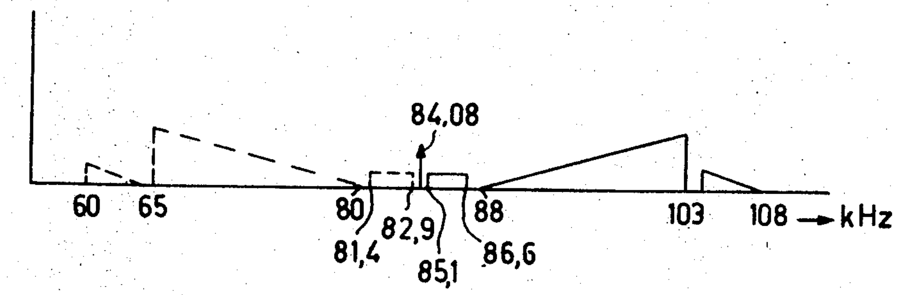
FIG. 4 show a frequency diagram for explanation of the transmitter and receiver shown in FIG. 1 and FIG. 2.

For illustration of the invention, FIG. 4 shows a frequency diagram of the transmitted signals in which the band of 88.03–103 kc./s. is used for the transmission of the music signal in the basic group of 60–108 kc./s. and the band of 85.1–86.6 kc./s. is used for the control signal. If it is desired to transmit a second music signal, for example, for application of stereophony then this transmission takes place in the frequency band of 65–79.97 kc./s. shown by a broken line and in the band of 81.4–82.9 kc./s. for the control signal. As is illustrated in the figure, the central part of the basic group is used for optimum transmission of the two control signals in the bands 81.4–82.9 kc./s. and of 85.1–86.6 kc./s. since this part has optimum transmission properties; in fact, this prevents an unwanted phase interference of the frequency modulated control signal in the transmission over a distance of 2500 km.

When applying the frequency diagram shown, the band of the carrier telephony basic group 60–108 kc./s. still leaves enough space for the transmission of additional signals, for example, a speech signal on either side of the music signals in the bands of 60–64 kc./s. and 104–108 kc./s. a pilot signal of 84.08 kc./s. If necessary, another carrier telephony group may be used for the music transmission, for example, the group of 12–60 kc./s. or of 108–156 kc./s.

In order to regain at the receiver end in FIG. 2, the single sideband music signal received through line 8 in the band of 88.03–103 kc./s. and the control signal in the band of 85.1–86.6 kc./s. the received signals are supplied to separating filters 22, 34 through the amplifier 19 with the aid of a fork 33, the single sideband music signal being derived from the separating filter 34 having a passband of 88.03–103 kc./s. and the control signal being derived from separating filter 22 in the form of the control signal filter having a passband of 85.1–86.6 kc./s. In this case the control signal is supplied to a second fork 35 in which the control signal derived from one branch of the fork is utilized for the expansion control while the control signal derived from the other branch of the fork is supplied to the compander 21 after joining in a fork 37 with the single sideband music signal, through an adjusting member in the form of an adjusting amplifier 36, which will be discussed hereinafter.

For expansion control, the expander 20 includes a difference producer 38 the output signal of which controls the compander 21 and to the input terminals of which are applied on the one hand the output signal of a frequency demodulator 39 which is fed by the received control signal selected in the control signal filter 22 and limited in an amplitude limiter 40, and on the other hand the output signal of a rectifier 41 including an associated low pass filter 42 having a limit frequency of, for example 1000 c./s., to which rectifier 41 the output signal of the compander 21 is applied. In this case, the control signal derived from the fork 35 is applied to the limiter 40 through an equalizing network 43 while the output signal of the compander 21, using a fork 44, is supplied to the single sideband demodulator 24 and also through an amplifier 45 to the rectifier 41 connected to the difference producer 38, which rectifier is designed with advantage as a mean-value rectifier for a more favourable reproduction quality.

For the expansion control the control signal selected in the control signal filter 22 and varying both in amplitude and in frequency, is supplied at a constant amplitude value to the frequency demodulator 39, after equalizing in the equalizing network 43 and amplitude limitation in the amplitude limiter 40, the output signal of which frequency demodulator controls the compander 21 in the loop: output difference producer 38, compander 21, fork 44, amplifier 45, rectifier 41, lowpass filter 42, input difference producer 38. The loop described forms as such a feedback control system in which the output signal of the rectifier 41 is forced to follow exactly in its level the output signal of the frequency demodulator 39 with the result that the output signal of the rectifier 41 at the receiver end follows exactly the ouput signal of the compression rectifier 10, since in fact the output signal of the frequency demodulator 39 is always equal to the output signal of the frequency demodulator 30 at the transmitter end.

If the intensity ratio of the control signal received through line 46 and the single sideband music signal, which intensity ratio has remained unchanged in the transmission of said signals from the input of the compander 9 at the transmitter end to the fork 33 at the receiver end, is made equal, by additional amplification of the control signal in the adjusting amplifier 36 at the input of the compander 21, to the intensity ratio of said signals at the input of compression rectifier 10 these two intensity ratios in the described embodiment differ in fact by a constant factor of 1.78 as already mentioned hereinbefore then the intensity ratio of the control signal and the single sideband music signal at the input of said rectifiers 41, 10 is also the same with equal output signal of the rectifier 41 at the receiver end and of the compression rectifier 10 at the transmitter end. Then the single sideband music signal at the input of the rectifier 41 at the receiver end is exactly equal to the single sideband music signal at the input of the compression rectifier 10 at the transmitter end, apart from the constant fork attenuation of the fork 44 and the constant amplification factor of the amplifier 45, is thus also equal to the single sideband music signal at the output of the compander 21, independent of the control characteristics of the companders 9, 21 and variations of attenuation in the transmission path. Important in regaining the signal dynamic range is the absence of selective filters in the feedback control system: output difference producer 38, compander 21, fork 44, amplifier 45, rectifier 41, low pass filter 42, input difference producer 38, so that a sensitive control can be applied without risk of instabilities.

In addition to the mentioned advantages of this sensitive dynamic range control, which is independent of the control characteristics of the companders 9, 21 and of variations of attenuations in the transmission path, the system according to the invention is distinguished by its extreme insensitivity to noise, which is caused by the fact that frequency modulation is also applied for the transmission of the control signal, the occurring level and frequency variations being mutually opposed. For example, at a small level of the control signal and thus an associated relatively high sensitivity to noise, the control signal actually shows a high frequency deviation so that the associated sensitivity to noise has a favourable value. Both effects counteract each other and in this manner a considerable improvement in the signal-to-noise ratio was realized in the described embodiment over the entire dynamic control range of 32 db which, relative to the known systems mentioned hereinbefore, provides an improvement of approximately 20 db. All these advantages, together with the realized excellent reproduction quality, make this system in a technical respect particularly interesting for transmission of music signals over large distances, the more so since this system amply satisfies the CCITT recommendations.

It is to be noted that instead of the adjusting amplifier 36 for additional amplification of the control signal, it is also possible to use in the embodiment described an adjusting attenuator serving for attenuation of the single sideband musical signal, which attenuator is then applied between the separating filter 34 and the fork 37. Furthermore, the control signal for the compander 9 may directly be derived from the compression rectifier 10, at the transmitter end for compression control; however, in the embodiment described, in which the control signal for the compander 9 is derived from the frequency demodulator 30, sudden level variations in the music signal are found to be better reproduced.

To obtain optimum transmission conditions in the systems described hereinbefore, the intensity ratios of the control signal and the single sideband music signal at the input of the compander 9 and at the input of the compression rectifier 10 are chosen to be different. With few concessions to the optimum transmission conditions a real saving of apparatus can be obtained in this respect by making said intensity ratios equal to each other, which saves more particularly an adjustable attenuator 15 or 16 and the forks 17 and 18 at the transmitter end and the adjustable amplifier 36 and the forks 35 and 37 at the receiver end.

Finally it is to be noted that instead of a dynamic range control on the single sideband music signal, it is alternatively possible to use a dynamic range control on the audio frequency music signal; however, a better reproduction quality is realized with dynamic range control on the single sideband music signal.

What is claimed is:

1. A signal transmission system comprising a transmitter and a receiver, said transmitter comprising a source of information signals, a dynamic compressor, and means for transmitting the output of said dynamic compressor, said dynamic compressor comprising a first compander, a source of control signals of a frequency outside the band of said information signals, means applying said information and control signals to the signal input of said first compander, means applying the output of said first compander to said transmitting means, a compression rectifier means, means applying said information signals to said rectifier means, a time demodulator means having an input connected to said source of control signals and an output, a difference signal producing means having inputs connected to the outputs of said compression rectifier means and time demodulator means respectively and an output, and modulator means connected to said source of control signals to time modulate said control signals as a function of said output difference signal; said receiver comprising a dynamic expander, an output circuit, and signal receiving means, said dynamic expander comprising a second compander, means applying received signals to the signal input of said second compander, means applying the output of said second compander to said output circuit, a difference producer having an output connected to control said second compander, filter means for selecting the control signal band of said received signals, means for time demodulating the output of said filter means, and a rectifier connected to rectify a portion of the output of said second compander, said difference producer having a first input connected to said time demodulating means and a second input connected to the output of said rectifier.

2. A transmitter comprising a source of information signals; a compander having an input coupled to said information signal source, an output, and a control terminal; a source of control signals having a frequency different from said information signals coupled to said compander input; a time demodulator having an input coupled to said control signal source and an output coupled to said control terminal; a difference signal producer having a first input coupled to said demodulator output, a second input, and an output; a rectifier having an input coupled to said information signal source and an output coupled to said difference producer second input; a time modulator having an input coupled to said difference-signal producer output and an output coupled to said control signal source; and means for transmitting the output of the compander.

3. A transmitter as claimed in claim 2 wherein said time modulator and time demodulator comprise a frequency modulator and frequency demodulator respectively.

4. A transmitter as claimed in claim 2 further comprising means for applying said control signal to said rectifier input.

5. A transmitter as claimed in claim 4 wherein said applying means comprises an adjustable attenuator, said attenuator being coupled to the input of said compander.

6. A transmitter as claimed in claim 2 wherein said rectifier comprises a mean value rectifier.

7. A transmitter as claimed in claim 2 wherein said source of information signals comprises a single sideband generator.

8. A receiver comprising means for receiving a signal having information and control signal components; a compander having an input coupled to said receiving means, an output, and a control terminal; filter means for selecting said control signal having an input coupled to said receiving means and an output; a time demodulator having an input coupled to said filter output and an output; a difference signal producer having a first input coupled to said demodulator output, a second input, and an output coupled to said control terminal; a rectifier coupled between said compander output and said difference producer second input, and an output circuit coupled to said compander output.

9. A receiver as claimed in claim 8 further comprising an amplitude limiter coupled between said filter and said time demodulator.

10. A receiver as claimed in claim 9 further comprising an equalizer coupled between said filter and said limiter.

11. A receiver as claimed in claim 8 wherein said time demodulator comprises a frequency demodulator.

12. A receiver as claimed in claim 8 further comprising means for variable applying said control signal to said compander input, said variable applying means being set so that the intensity ratio between the control and information signals at said compander input equals said ratio at said rectifier input.

13. A receiver as claimed in claim 8 wherein said rectifier comprises a mean value rectifier.

14. A receiver as claimed in claim 8 wherein said received signal comprises a single sideband signal.

(References on following page)

References Cited

UNITED STATES PATENTS

| | | | |
|---|---|---|---|
| 2,103,745 | 12/1937 | Frantz et al. | 325—61 |
| 2,907,831 | 10/1959 | Jager et al. | 325—50 |
| 3,003,037 | 10/1961 | Jager et al. | 325—50 |
| 3,024,313 | 3/1962 | Ensink et al. | 179—15.5 |
| 3,024,312 | 3/1962 | Daguet | 325—50X |

ROBERT L. GRIFFIN, Primary Examiner

R. S. BELL, Assistant Examiner

U.S. Cl. X.R.

179—15.55; 325—46